(12) United States Patent
Hudman et al.

(10) Patent No.: US 11,442,542 B2
(45) Date of Patent: *Sep. 13, 2022

(54) SYSTEMS AND METHODS FOR EYE TRACKING

(71) Applicant: Valve Corporation, Bellevue, WA (US)

(72) Inventors: Joshua Hudman, Bellevue, WA (US); Alan Yates, Bellevue, WA (US); Gordon Wayne Stoll, Sammamish, WA (US); Evan Fletcher, Bellevue, WA (US)

(73) Assignee: Valve Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,838

(22) Filed: Jul. 1, 2021

(65) Prior Publication Data
US 2021/0325963 A1  Oct. 21, 2021

Related U.S. Application Data

(63) Continuation of application No. 16/773,840, filed on Jan. 27, 2020, now Pat. No. 11,073,906.

(51) Int. Cl.
*G06F 3/01* (2006.01)
*G06N 3/08* (2006.01)
(Continued)

(52) U.S. Cl.
CPC ............ *G06F 3/013* (2013.01); *G01J 1/0429* (2013.01); *G01J 1/42* (2013.01); *G06N 3/08* (2013.01);
(Continued)

(58) Field of Classification Search
CPC ..... A63F 13/00; A63F 13/25; G02B 27/0093; G02B 27/017; G02B 27/0172;
(Continued)

(56) References Cited

U.S. PATENT DOCUMENTS 6,982,773 B2   1/2006  Kurtz et al.
7,160,017 B2   1/2007  Lee et al.
(Continued)

OTHER PUBLICATIONS

Horburg et al., "Multiband retardation control using multi-twist retarders" Proc. of SPIE, Polarization: Measurement, Analysis, and Remote Sensing XI, vol. 9099, 909902, 2014, 9 pages.
(Continued)

*Primary Examiner* — Nelson M Rosario
(74) *Attorney, Agent, or Firm* — Seed Intellectual Property Law Group LLP

(57) ABSTRACT

The present disclosure is directed to systems and methods of eye tracking for use in various applications, such as virtual reality or augmented reality applications that include head-mounted display devices. An eye tracking subsystem may be provided that includes a plurality of assemblies that each include a light source, such as an LED, a light detector, such as a silicon photodiode, and a polarizer that is configured to prevent light reflected via specular reflection from reaching the light detectors so that only scattered light is detected by the light detectors. Machine learning or other techniques may be used to track or otherwise determine a user's gaze direction, which may be used by one or more components of an HMD device to improve its functionality in various ways.

32 Claims, 7 Drawing Sheets

(51) Int. Cl.
*G01J 1/04* (2006.01)
*G01J 1/42* (2006.01)
*G02B 5/30* (2006.01)
*G06N 3/04* (2006.01)

(52) U.S. Cl.
CPC .......... *G02B 5/3025* (2013.01); *G06N 3/0445* (2013.01)

(58) Field of Classification Search
CPC .............. G02B 30/26; G02B 30/52; G02B 2027/0134; G02B 2027/0138; G02B 2027/014; G02B 2027/0178; G02B 2027/0187; G06F 3/011; G06F 3/012; G06F 3/013; G06F 3/014; G06F 3/016; G06F 3/017; G06F 3/0304; G06F 3/0346; G06F 3/0482; G06K 9/00268; G06K 9/00671; G06K 9/00389; G06K 9/4642; G06K 9/4652; G10L 19/00; H04N 13/117; H04N 13/139; H04N 13/189; H04N 13/204; H04N 13/239; H04N 13/271; H04N 13/279; H04N 13/344; H04N 13/366; H04N 13/383; H04N 21/414; H04N 13/371; H04N 2013/0081; H04N 7/185

See application file for complete search history.

(56) References Cited

U.S. PATENT DOCUMENTS

| | | |
|---|---|---|
| 7,295,312 B1 | 11/2007 | Gerhart et al. |
| 8,004,675 B2 | 8/2011 | Lefaudeux |
| 8,235,533 B2 | 8/2012 | Hudman et al. |
| 8,368,889 B2 | 2/2013 | Schwiegerling et al. |
| 8,982,313 B2 | 3/2015 | Escuti et al. |
| 9,298,041 B2 | 3/2016 | Escuti et al. |
| 9,335,586 B2 | 5/2016 | Escuti et al. |
| 9,410,677 B2 | 8/2016 | Wheatley et al. |
| 10,203,489 B2 | 2/2019 | Khan et al. |
| 2011/0310220 A1 | 12/2011 | McEldowney |
| 2013/0286479 A1 | 10/2013 | Sung et al. |
| 2015/0131311 A1 | 5/2015 | Wheatley et al. |
| 2016/0182889 A1 | 6/2016 | Olmstead |
| 2016/0349516 A1 | 12/2016 | Alexander et al. |
| 2019/0243147 A1 | 8/2019 | Smithwick et al. |
| 2019/0377183 A1* | 12/2019 | Sharp ................. G02B 27/0037 |
| 2020/0301147 A1 | 9/2020 | Klug |

OTHER PUBLICATIONS

Horburg et al., "Wide color gamut multi-twist retarders" Proc. of SPIE, Emerging Liquid Crystal Technologies X, vol. 9384, 93840W, 2015, 11 pages.

ImagineOptix, "Consumer Electronics Optics", Augmented and Virtual Reality Optics Technology in Consumer Electronics—ImagineOptix, retrieved from https://www.h11a,linoptix.com/applkaUons/consumer-electronics/, on Dec. 17, 2019, 3pages.

International Search Report and Written Opinion, International Application No. PCT/US2021/014190, dated Mar. 4, 2021, 14 pages.

Komanduri et al., "Multi-twist retarders for broadband polarization transformation", Proc. of SPIE, Emerging Liquid Crystal Technologies VII, vol. 8279, 82790E, 2012, 10 pages.

Komanduri et al., "Multi-twist retarders: broadband retardation control using self-aligning reactive liquid crystal layers", Optics Express, Optical Society of America, vol. 21, No. 1 Jan. 14, 2013, 17 pages.

Perreault, "Triple Wollaston-prism complete-Stokes imaging polarimeter" Optics Letters, Optical Society of America, vol. 38, No. 19, Oct. 1, 2013, 4 pages.

* cited by examiner

SYSTEMS AND METHODS FOR EYE TRACKING

TECHNICAL FIELD

The following disclosure relates generally to techniques for eye tracking, and more specifically to techniques for eye tracking for use in head-mounted display devices.

BACKGROUND

A head-mounted display (HMD) device or system is an electronic device that is worn on a user's head and, when so worn, secures at least one electronic display within a viewable field of at least one of the user's eyes, regardless of the position or orientation of the user's head. HMD devices used to implement virtual reality systems typically envelop a wearer's eyes completely and substitute a "virtual" reality for the actual view (or actual reality) in front of the wearer, while HMD devices for augmented reality systems typically provide a semi-transparent or transparent overlay of one or more screens in front of a wearer's eyes such that an actual view is augmented with additional information. For augmented reality systems, the "display" component of a HMD device is either transparent or at a periphery of the user's field of view so that it does not completely block the user from being able to see their external environment.

BRIEF SUMMARY

Figure 1:
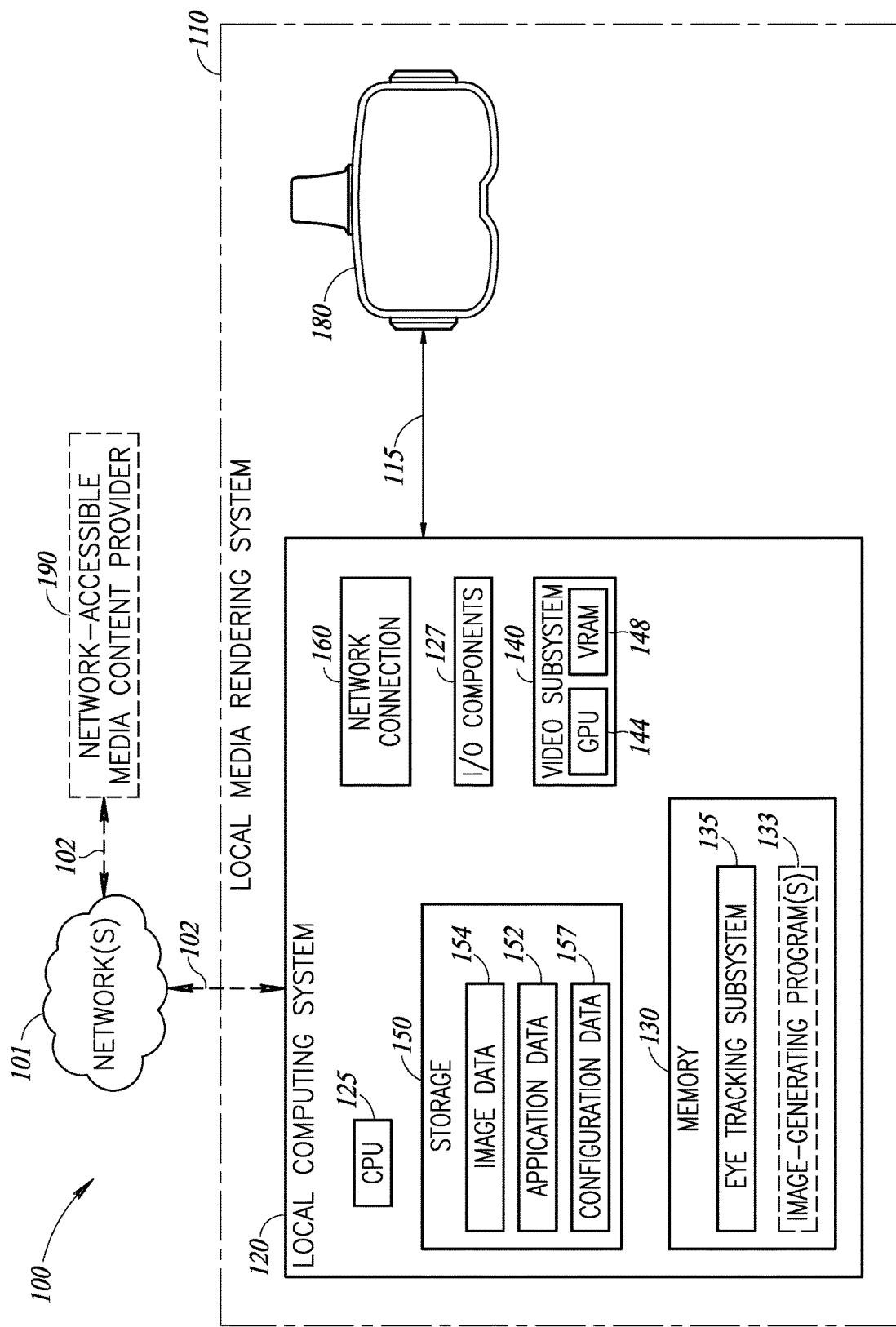
FIG. 1 is a schematic diagram of a networked environment that includes one or more systems suitable for performing at least some techniques described in the present disclosure, including embodiments of an eye tracking subsystem.

A head-mounted display (HMD) system may be summarized as including a support structure wearable on the head of a user; an eye tracking subsystem coupled to the support structure, the eye tracking subsystem including a plurality of eye tracking assemblies that each include a light source operative to emit light; a light detector operative to detect light; and a polarizer positioned proximate to at least one of the light source and the light detector, the polarizer configured to prevent light reflected via specular reflection from being received by the light detector; at least one processor; and memory storing a set of instructions or data that, as a result of execution, cause the HMD system to selectively cause the light sources of the plurality of eye tracking assemblies to emit light; receive light detection information captured by the light detectors of the plurality of eye tracking assemblies; provide the received light detection information as input to a prediction model; receive, from the prediction model in response to providing the light detection information, a determined gaze direction for an eye of the user; and provide the determined gaze direction to a component associated with the HMD system for use thereby. The light detection information may include a signature radiation pattern of each of the light sources after the light from the light source has reflected, scattered, or been absorbed of off the face or eye of the user. Each of the light sources may be directed toward an expected location of a pupil of the user. The light sources may include light emitting diodes that emit light having a wavelength that is between 780 nm and 1000 nm. The light detectors may include photodiodes. The eye tracking subsystem may include four eye tracking assemblies positioned to determine the gaze direction of a left eye of the user and four eye tracking assemblies positioned to determine the gaze direction of a right eye of the user. The polarizer may include two cross linear polarizers. For each of the plurality of eye tracking assemblies, the polarizer may include a first polarizer positioned in a light emitting path of the light source and a second polarizer positioned in a light detecting path of the light detector. The polarizer may include at least one of a circular polarizer or a linear polarizer. For each of the plurality of eye tracking assemblies, the light source may be positioned away from an optical axis of an eye of the user to provide dark field illumination of the pupil. The prediction model may include a machine learning model or other type of function or model (e.g., polynomial(s), lookup table). The machine learning model may include a mixture density network (MDN) model. The machine learning model may include a recurrent neural network (RNN) model. The machine learning model may utilize past input information or eye motion information to determine the gaze direction. The machine learning model may be a model trained during field operation of a plurality of HMD systems. The HMD system may include at least one display, and the at least one processor may cause the at least one display to present a user interface element; may selectively cause the light sources of the plurality of eye tracking assemblies to emit light; may receive light detection information captured by the light detectors of the plurality of eye tracking assemblies; and may update the machine learning model based at least in part on the received light detection information and known or inferred gaze direction information associated with the received light detection information. The user interface element may include a static user interface element or a moving user interface element. The HMD system may include at least one display, and the at least one processor may dynamically modify a rendering output of the at least one display based at least in part on the determined gaze direction. The HMD system may include an interpupillary distance (IPD) adjustment component, and the at least one processor may cause the IPD adjustment component to align at least one component of the HMD system for the user based at least in part on the determined gaze direction.

A method of operating a head-mounted display (HMD) system, the HMD system may include an eye tracking subsystem coupled to a support structure that includes a plurality of eye tracking assemblies that each include a light source, a light detector, and a polarizer, the method may be summarized as including selectively causing the light sources of the plurality of eye tracking assemblies to emit light; receiving light detection information captured by the plurality of light detectors; providing the received light detection information as input to a trained machine learning model; receiving, from the machine learning model in response to providing the light detection information, a determined gaze direction for an eye of a user; and providing the determined gaze direction to a component associated with the HMD system for use thereby. Providing the received light detection information as input to a trained machine learning model may include providing the received light detection information as input to a mixture density network (MDN) model. Providing the received light detection information as input to a trained machine learning model may include providing the received light detection information as input to a recurrent neural network (RNN) model. Providing the received light detection information as input to a trained machine learning model may include providing the received light detection information to a machine learning model that utilizes past input information or eye motion information to determine the gaze direction.

The method may further include training the machine learning model during field operation of a plurality of HMD systems. The HMD system may include at least one display, and the method may include causing the at least one display to present a user interface element; selectively causing the light sources of the plurality of eye tracking assemblies to emit light; receiving light detection information captured by the plurality of light detectors; and updating the machine learning model based at least in part on the received light detection information and known or inferred gaze direction information associated with the received light detection information. Causing the at least one display to present a user interface element may include causing the at least one display to present a static user interface element or a moving user interface element. The HMD system may include at least one display, and the method may include dynamically modifying an output of the at least one display based at least in part on the determined gaze direction.

The method may further include mechanically aligning at least one component of the HMD system for the user based at least in part on the determined gaze direction.

A head-mounted display (HMD) system may be summarized as including a support structure wearable on the head of a user; an eye tracking subsystem coupled to the support structure, the eye tracking subsystem including a plurality of eye tracking assemblies that each include a light emitting diode; a photodiode; and a polarizer positioned proximate to at least one of the light emitting diode and the photodiode, the polarizer configured to prevent light reflected via specular reflection from being received by the photodiode; at least one processor; and memory storing a set of instructions or data that, as a result of execution, cause the HMD system to selectively cause the light emitting diodes of the plurality of eye tracking assemblies to emit light; receive light detection information captured by the photodiodes of the plurality of eye tracking assemblies; provide the received light detection information as input to a trained machine learning model; receive, from the machine learning model in response to providing the light detection information, a determined gaze direction for an eye of the user; and dynamically modify operation of a component associated with the HMD system based at least in part on the determined gaze direction.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Eye tracking is a process by which the position, orientation, or motion of the eye may be measured, detected, sensed, determined, or monitored (collectively, "measured"). In many applications, this is done with a view towards determining the gaze direction of a user. The position, orientation, or motion of the eye may be measured in a variety of different ways, the least invasive of which may employ one or more optical detectors or sensors to optically track the eye. Some techniques may involve illuminating or flooding the entire eye, all at once, with infrared light and measuring reflections with at least one optical sensor that is tuned to be sensitive to the infrared light. Information about how the infrared light is reflected from the eye is analyzed to determine the positions, orientations, and/or motions of one or more eye features such as the cornea, pupil, iris, or retinal blood vessels.

Eye tracking functionality is highly advantageous in applications of wearable head-mounted display systems. Some examples of the utility of eye tracking in head-mounted display system include influencing where content is displayed in the user's field of view, conserving power, bandwidth, or computational resources by modifying the display of content that is outside of the user's field of view (e.g., foveated rendering), influencing what content is displayed to the user, determining where the user is looking or gazing, determining whether the user is looking at displayed content on a display, providing a method through which the user may control or interact with displayed content, and other applications.

The present disclosure relates generally to techniques for eye tracking. Such techniques may be used, for example, in a head-mounted display ("HMD") device used for VR or AR applications. Some or all of the techniques described herein may be performed via automated operations of embodiments of an eye tracking subsystem, such as implemented by one or more configured hardware processors and/or other configured hardware circuitry. The one or more hardware processors or other configured hardware circuitry of such a system or device may include, for example, one or more GPUs ("graphical processing units") and/or CPUs ("central processing units") and/or other microcontrollers ("MCUs") and/or other integrated circuits, such as with the hardware processor(s) being part of an HMD device or other device that incorporates one or more display panels on which the image data will be displayed or being part of a computing system that generates or otherwise prepares the image data to be sent to the display panel(s) for display, as discussed further below. More generally, such a hardware processors or other configured hardware circuitry may include, but are not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), digital signal processors (DSPs), programmable logic controllers (PLCs), etc. Additional details are included elsewhere herein, including with respect to FIG. 1 discussed below.

Technical benefits in at least some embodiments of the described techniques include addressing and mitigating increased media transmission bandwidths for image encoding by reducing image data size, improving speed of controlling display panel pixels (e.g., based at least in part on corresponding reduced image data size), improving foveated image systems and other techniques that reflect subsets of display panels and/or images of particular interest, etc. Foveated image encoding systems take advantage of particular aspects of the human visual system (which may provide detailed information only at and around a point of focus), but often use specialized computational processing in order to avoid visual artifacts to which peripheral vision is very sensitive (e.g., artifacts related to motion and contrast in video and image data). In cases of certain VR and AR displays, both the bandwidth and computing usage for processing high resolution media are exacerbated because a particular display device involves two separate display panels (i.e., one for each eye) with two separately addressable pixel arrays, each involving an appropriate resolution. Thus, the described techniques may be used, for example, for decreasing the transmission bandwidth for local and/or remote display of a video frame or other image, while preserving resolution and detail in a viewer's "area of interest" within an image while also minimizing computing usage for processing such image data. Furthermore, the use of lenses in head-mounted display devices and with other displays may provide a greater focus or resolution on a subset of the display panel, such that using such techniques to display lower-resolution information in other portions of the display panel may further provide benefits when using such techniques in such embodiments.

For illustrative purposes, some embodiments are described below in which specific types of information are acquired and used in specific types of ways for specific types of structures and by using specific types of devices. However, it will be understood that such described techniques may be used in other manners in other embodiments, and that the present disclosure is thus not limited to the exemplary details provided. As one non-exclusive example, various of the embodiments discussed herein include the use of images that are video frames—however, while many examples described herein refer to a "video frame" for convenience, it will be appreciated that the techniques described with reference to such examples may be employed with respect to one or more images of various types, including non-exclusive examples of multiple video frames in succession (e.g., at 30, 60, 90, 180 or some other quantity of frames per second), other video content, photographs, computer-generated graphical content, other articles of visual media, or some combination thereof. In addition, various details are provided in the drawings and text for exemplary purposes, but are not intended to limit the scope of the present disclosure. In addition, as used herein, a "pixel" refers to the smallest addressable image element of a display that may be activated to provide all possible color values for that display. In many cases, a pixel includes individual respective sub-elements (in some cases as separate "sub-pixels") for separately producing red, green, and blue light for perception by a human viewer, with separate color channels used to encode pixel values for the sub-pixels of different colors. A pixel "value" as used herein refers to a data value corresponding to respective levels of stimulation for one or more of those respective RGB elements of a single pixel.

Figure 2:
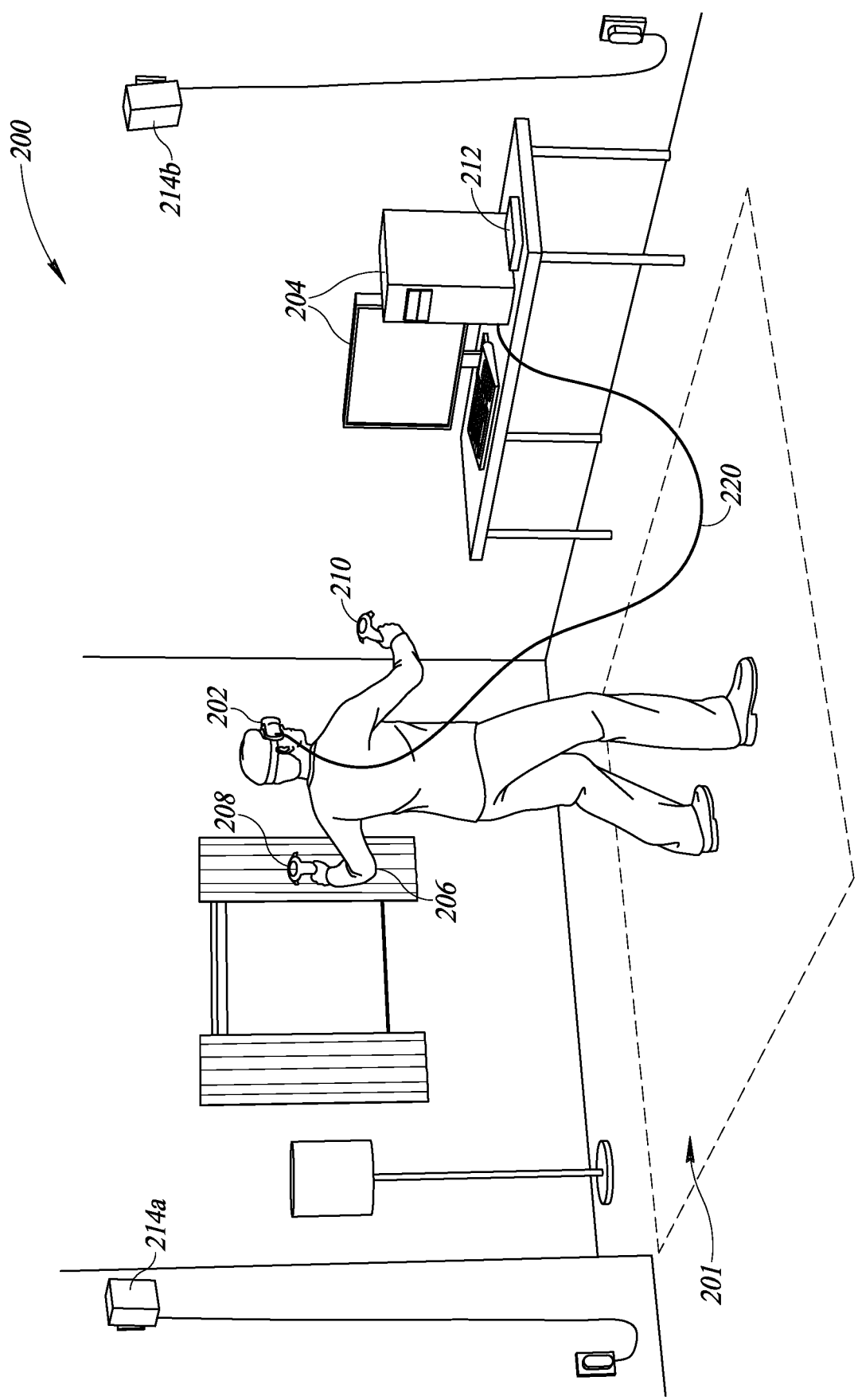
FIG. 2 is a diagram illustrating an example environment in which at least some of the described techniques are used with an example head-mounted display device that is tethered to a video rendering computing system and providing a virtual reality display to a user.

FIG. 1 is a schematic diagram of a networked environment 100 that includes a local media rendering (LMR) system 110 (e.g., a gaming system), which includes a local computing system 120 and display device 180 (e.g., an HMD device with two display panels) suitable for performing at least some techniques described herein. In the depicted embodiment of FIG. 1, the local computing system 120 is communicatively connected to display device 180 via transmission link 115 (which may be wired or tethered, such as via one or more cables as illustrated in FIG. 2 (cable 220), or instead may be wireless). In other embodiments, the local computing system 120 may provide encoded image data for display to a panel display device (e.g., a TV, console or monitor) via a wired or wireless link, whether in addition to or instead of the HMD device 180, and the display devices each includes one or more addressable pixel arrays. In various embodiments, the local computing system 120 may include a general purpose computing system; a gaming console; a video stream processing device; a mobile computing device (e.g., a cellular telephone, PDA, or other mobile device); a VR or AR processing device; or other computing system.

In the illustrated embodiment, the local computing system 120 has components that include one or more hardware processors (e.g., centralized processing units, or "CPUs") 125, memory 130, various I/O ("input/output") hardware components 127 (e.g., a keyboard, a mouse, one or more gaming controllers, speakers, microphone, IR transmitter and/or receiver, etc.), a video subsystem 140 that includes one or more specialized hardware processors (e.g., graphics processing units, or "GPUs") 144 and video memory (VRAM) 148, computer-readable storage 150, and a network connection 160. Also in the illustrated embodiment, an embodiment of an eye tracking subsystem 135 executes in memory 130 in order to perform at least some of the described techniques, such as by using the CPU(s) 125 and/or GPU(s) 144 to perform automated operations that implement those described techniques, and the memory 130 may optionally further execute one or more other programs 133 (e.g., to generate video or other images to be displayed, such as a game program). As part of the automated operations to implement at least some techniques described herein, the eye tracking subsystem 135 and/or programs 133 executing in memory 130 may store or retrieve various types of data, including in the example database data structures of storage 150, in this example, the data used may include various types of image data information in database ("DB") 154, various types of application data in DB 152, various types of configuration data in DB 157, and may include additional information, such as system data or other information.

The LMR system 110 is also, in the depicted embodiment, communicatively connected via one or more computer networks 101 and network links 102 to an exemplary network-accessible media content provider 190 that may further provide content to the LMR system 110 for display, whether in addition to or instead of the image-generating programs 133. The media content provider 190 may include one or more computing systems (not shown) that may each have components similar to those of local computing system 120, including one or more hardware processors, I/O components, local storage devices and memory, although some details are not illustrated for the network-accessible media content provider for the sake of brevity.

It will be appreciated that, while the display device 180 is depicted as being distinct and separate from the local computing system 120 in the illustrated embodiment of FIG. 1, in certain embodiments some or all components of the local media rendering system 110 may be integrated or housed within a single device, such as a mobile gaming device, portable VR entertainment system, HMD device, etc. In such embodiments, transmission link 115 may, for example, include one or more system buses and/or video bus architectures.

As one example involving operations performed locally by the local media rendering system 120, assume that the local computing system is a gaming computing system, such that application data 152 includes one or more gaming applications executed via CPU 125 using memory 130, and that various video frame display data is generated and/or processed by the image-generating programs 133, such as in conjunction with GPU 144 of the video subsystem 140. In order to provide a quality gaming experience, a high volume of video frame data (corresponding to high image resolution for each video frame, as well as a high "frame rate" of approximately 60-180 of such video frames per second) is generated by the local computing system 120 and provided via the wired or wireless transmission link 115 to the display device 180.

It will also be appreciated that computing system 120 and display device 180 are merely illustrative and are not intended to limit the scope of the present disclosure. The computing system 120 may instead include multiple interacting computing systems or devices, and may be connected to other devices that are not illustrated, including through one or more networks such as the Internet, via the Web, or via private networks (e.g., mobile communication networks, etc.). More generally, a computing system or other computing node may include any combination of hardware or software that may interact and perform the described types of functionality, including, without limitation, desktop or other computers, game systems, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. The display device 180 may similarly include one or more devices with one or more display panels of various types and forms, and optionally include various other hardware and/or software components.

In addition, the functionality provided by the eye tracking subsystem 135 may in some embodiments be distributed in one or more components, and in some embodiments some of the functionality of the eye tracking subsystem 135 may not be provided and/or other additional functionality may be available. It will also be appreciated that, while various items are illustrated as being stored in memory or on storage while being used, these items or portions of them may be transferred between memory and other storage devices for purposes of memory management or data integrity. Thus, in some embodiments, some or all of the described techniques may be performed by hardware that include one or more processors or other configured hardware circuitry or memory or storage, such as when configured by one or more software programs (e.g., by the eye tracking subsystem 135 or it components) and/or data structures (e.g., by execution of software instructions of the one or more software programs and/or by storage of such software instructions and/or data structures). Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

FIG. 2 illustrates an example environment 200 in which at least some of the described techniques are used with an example HMD device 202 that is coupled to a video rendering computing system 204 via a tethered connection 220 (or a wireless connection in other embodiments) to provide a virtual reality display to a human user 206. The user wears the HMD device 202 and receives displayed information via the HMD device from the computing system 204 of a simulated environment different from the actual physical environment, with the computing system acting as an image rendering system that supplies images of the simulated environment to the HMD device for display to the user, such as images generated by a game program and/or other software program executing on the computing system. The user is further able to move around within a tracked volume 201 of the actual physical environment 200 in this example, and may further have one or more I/O ("input/output") devices to allow the user to further interact with the simulated environment, which in this example includes hand-held controllers 208 and 210.

In the illustrated example, the environment 200 may include one or more base stations 214 (two shown, labeled base stations 214a and 214b) that may facilitate tracking of the HMD device 202 or the controllers 208 and 210. As the user moves location or changes orientation of the HMD device 202, the position of the HMD device is tracked, such as to allow a corresponding portion of the simulated environment to be displayed to the user on the HMD device, and the controllers 208 and 210 may further employ similar techniques to use in tracking the positions of the controllers (and to optionally use that information to assist in determining or verifying the position of the HMD device). After the tracked position of the HMD device 202 is known, corresponding information is transmitted to the computing system 204 via the tether 220 or wirelessly, which uses the tracked position information to generate one or more next images of the simulated environment to display to the user.

There are numerous different methods of positional tracking that may be used in the various implementations of the present disclosure, including, but not limited to, acoustic tracking, inertial tracking, magnetic tracking, optical tracking, combinations thereof, etc.

In at least some implementations, the HMD device 202 may include one or more optical receivers or sensors that may be used to implement tracking functionality or other aspects of the present disclosure. For example, the base stations 214 may each sweep an optical signal across the tracked volume 201. Depending on the requirements of each particular implementation, each base station 214 may generate more than one optical signal. For example, while a single base station 214 is typically sufficient for six-degree-of-freedom tracking, multiple base stations (e.g., base stations 214a, 214b) may be necessary or desired in some embodiments to provide robust room-scale tracking for HMD devices and peripherals. In this example, optical receivers are incorporated into the HMD device 202 and or other tracked objects, such as the controllers 208 and 210. In at least some implementations, optical receivers may be paired with an accelerometer and gyroscope Inertial Measurement Unit ("IMU") on each tracked device to support low-latency sensor fusion.

In at least some implementations, each base station 214 includes two rotors which sweep a linear beam across the tracked volume 201 on orthogonal axes. At the start of each sweep cycle, the base station 214 may emit an omni-directional light pulse (referred to as a "sync signal") that is visible to all sensors on the tracked objects. Thus, each sensor computes a unique angular location in the swept volume by timing the duration between the sync signal and the beam signal. Sensor distance and orientation may be solved using multiple sensors affixed to a single rigid body.

The one or more sensors positioned on the tracked objects (e.g., HMD device 202, controllers 208 and 210) may comprise an optoelectronic device capable of detecting the modulated light from the rotor. For visible or near-infrared (NIR) light, silicon photodiodes and suitable amplifier/detector circuitry may be used. Because the environment 200 may contain static and time-varying signals (optical noise) with similar wavelengths to the signals of the base stations 214 signals, in at least some implementations the base station light may be modulated in such a way as to make it easy to differentiate from any interfering signals, and/or to filter the sensor from any wavelength of radiation other than that of base station signals.

Inside-out tracking is also a type positional tracking that may be used to track the position of the HMD device 202 and/or other objects (e.g., controllers 208 and 210, tablet computers, smartphones). Inside-out tracking differs from outside-in tracking by the location of the cameras or other sensors used to determine the HMD's position. For inside-out tracking, the camera or sensors are located on the HMD, or object being tracked, while in outside-out tracking the camera or sensors are placed in a stationary location in the environment.

An HMD that utilizes inside-out tracking utilizes one or more cameras to "look out" to determine how its position changes in relation to the environment. When the HMD moves, the sensors readjust their place in the room and the virtual environment responds accordingly in real-time. This type of positional tracking can be achieved with or without markers placed in the environment. The cameras that are placed on the HMD observe features of the surrounding environment. When using markers, the markers are designed to be easily detected by the tracking system and placed in a specific area. With "markerless" inside-out tracking, the HMD system uses distinctive characteristics (e.g., natural features) that originally exist in the environment to determine position and orientation. The HMD system's algorithms identify specific images or shapes and use them to calculate the device's position in space. Data from accelerometers and gyroscopes can also be used to increase the precision of positional tracking.

Figure 3:
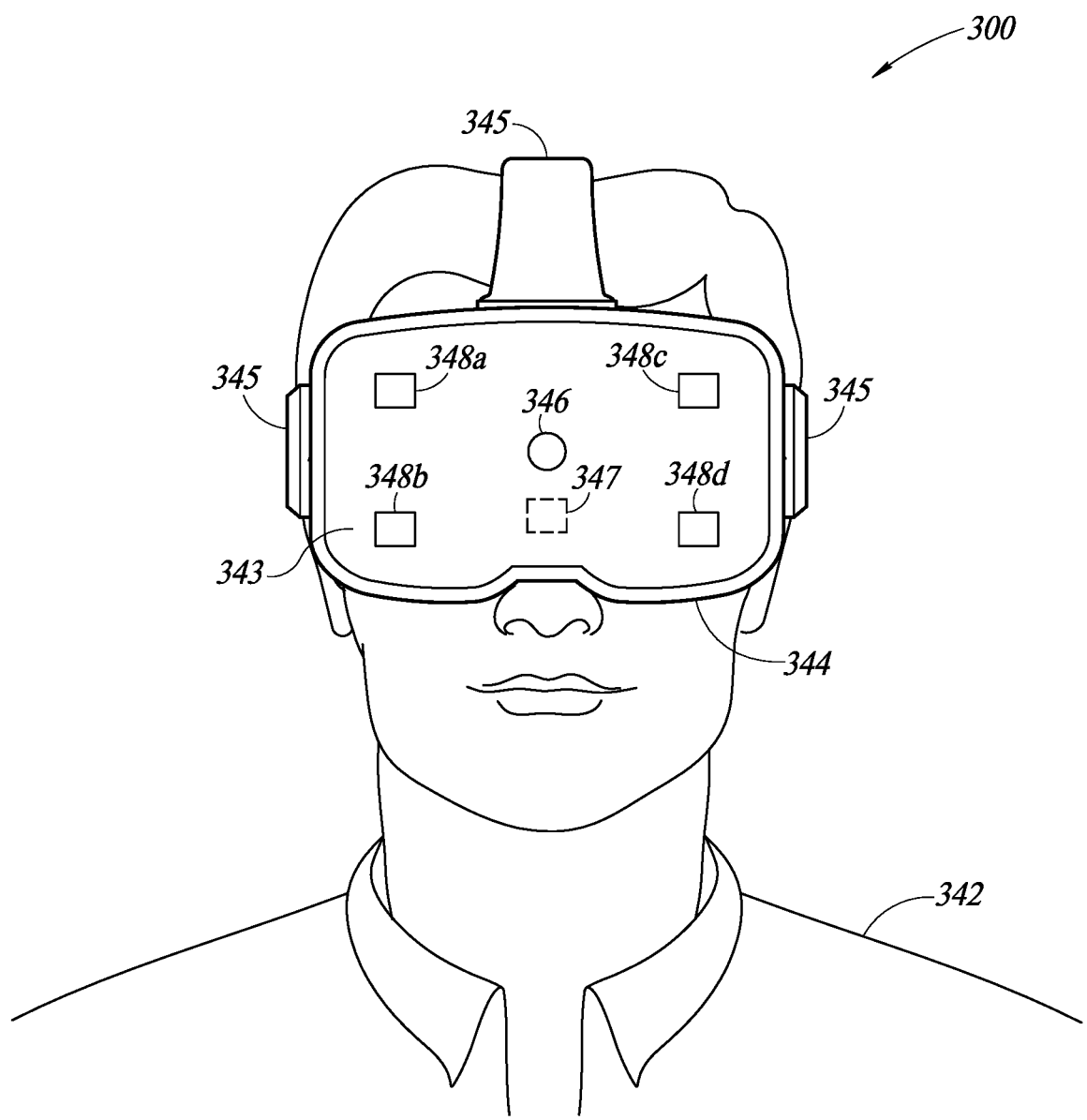
FIG. 3 is a front pictorial diagram of an HMD device having binocular display subsystems.

FIG. 3 shows information 300 illustrating a front view of an example HMD device 344 when worn on the head of a user 342. The HMD device 344 includes a front-facing structure 343 that supports a front-facing or forward camera 346 and a plurality of sensors 348a-348d (collectively 348) of one or more types. As one example, some or all of the sensors 348 may assist in determining the location and orientation of the device 344 in space, such as light sensors to detect and use light information emitted from one or more external devices (not shown, e.g., base stations 214 of FIG. 2). As shown, the forward camera 346 and the sensors 348 are directed forward toward an actual scene or environment (not shown) in which the user 342 operates the HMD device 344. The actual physical environment may include, for example, one or more objects (e.g., walls, ceilings, furniture, stairs, cars, trees, tracking markers, or any other types of objects). The particular number of sensors 348 may be fewer or more than the number of sensors depicted. The HMD device 344 may further include one or more additional components that are not attached to the front-facing structure (e.g., are internal to the HMD device), such as an IMU (inertial measurement unit) 347 electronic device that measures and reports the HMD device's 344 specific force, angular rate, and/or the magnetic field surrounding the HMD device (e.g., using a combination of accelerometers and gyroscopes, and optionally, magnetometers). The HMD device may further include additional components that are not shown, including one or more display panels and optical lens systems that are oriented toward eyes (not shown) of the user and that optionally have one or more attached internal motors to change the alignment or other positioning of one or more of the optical lens systems and/or display panels within the HMD device, as discussed in greater detail below with respect to FIG. 4.

The illustrated example of the HMD device 344 is supported on the head of user 342 based at least in part on one or more straps 345 that are attached to the housing of the HMD device 344 and that extend wholly or partially around the user's head. While not illustrated here, the HMD device 344 may further have one or more external motors, such as attached to one or more of the straps 345, and automated corrective actions may include using such motors to adjust such straps in order to modify the alignment or other positioning of the HMD device on the head of the user. It will be appreciated that HMD devices may include other support structures that are not illustrated here (e.g., a nose piece, chin strap, etc.), whether in addition to or instead of the illustrated straps, and that some embodiments may include motors attached one or more such other support structures to similarly adjust their shape and/or locations to modify the alignment or other positioning of the HMD device on the head of the user. Other display devices that are not affixed to the head of a user may similarly be attached to or part of one or structures that affect the positioning of the display device, and may include motors or other mechanical actuators in at least some embodiments to similarly modify their shape and/or locations to modify the alignment or other positioning of the display device relative to one or more pupils of one or more users of the display device.

Figure 4:
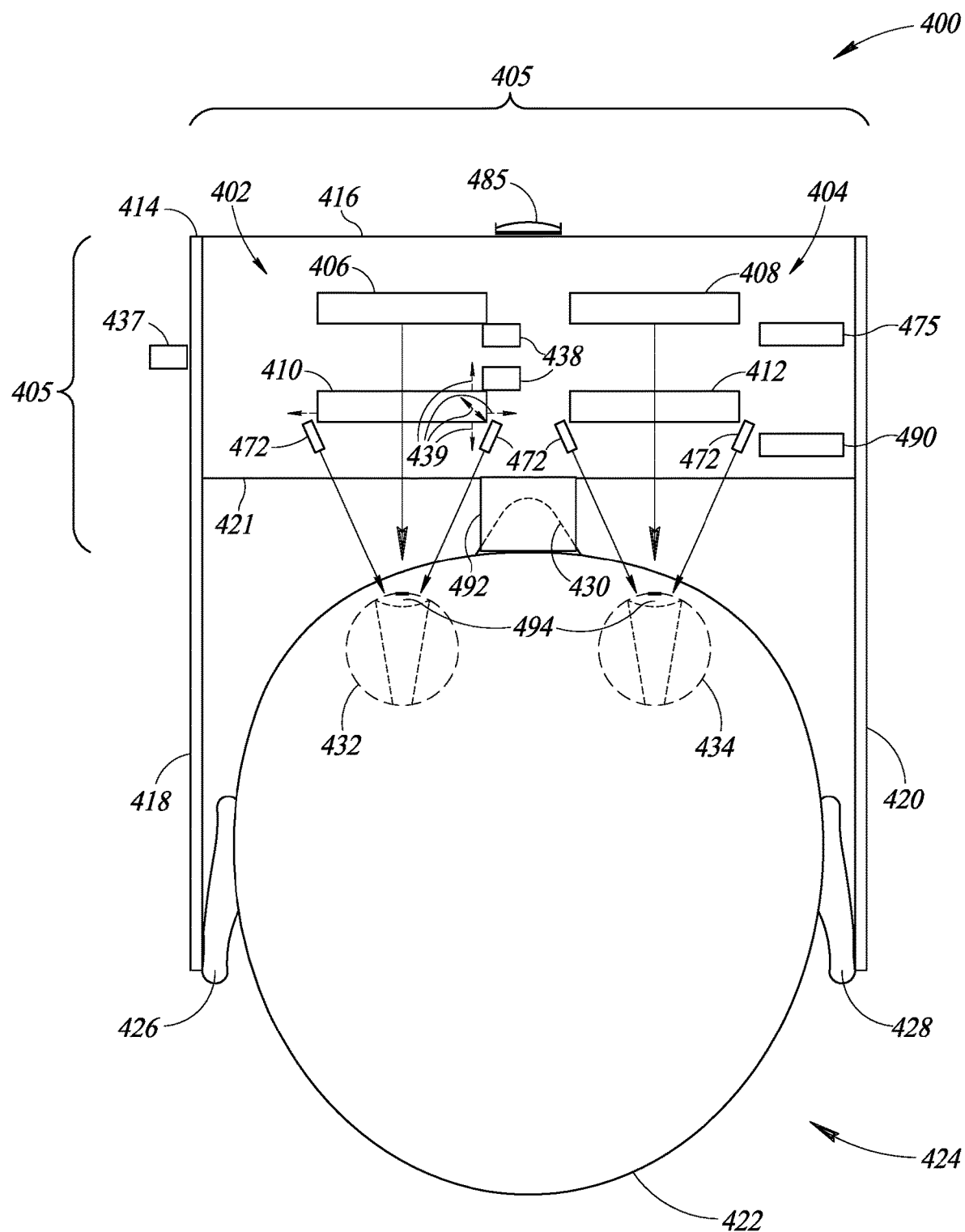
FIG. 4 illustrates a top plan view of an HMD device having binocular display subsystems and various sensors, according to an example embodiment of the present disclosure.

FIG. 4 illustrates a simplified top plan view 400 of an HMD device 405 that includes a pair of near-to-eye display systems 402 and 404. The HMD device 405 may, for example, be the same or similar HMD devices illustrated in FIGS. 1-3 or a different HMD device, and the HMD devices discussed herein may further be used in the examples discussed further below. The near-to-eye display systems 402 and 404 of FIG. 4 include display panels 406 and 408, respectively (e.g., OLED micro-displays), and respective optical lens systems 410 and 412 that each have one or more optical lenses. The display systems 402 and 404 may be mounted to or otherwise positioned within a housing (or frame) 414, which includes a front-facing portion 416 (e.g., the same or similar to the front-facing surface 343 of FIG. 3), a left temple 418, right temple 420 and interior surface 421 that touches or is proximate to a face of a wearer user 424 when the HMD device is worn by the user. The two display systems 402 and 404 may be secured to the housing 414 in an eye glasses arrangement which can be worn on the head 422 of a wearer user 424, with the left temple 418 and right temple 420 resting over the user's ears 426 and 428, respectively, while a nose assembly 492 may rest over the user's nose 430. In the example of FIG. 4, the HMD device 405 may be supported on the head of the user in part or in whole by the nose display and/or the right and left over-ear temples, although straps (not shown) or other structures may be used in some embodiments to secure the HMD device to the head of the user, such as the embodiments shown in FIGS. 2 and 3. The housing 414 may be shaped and sized to position each of the two optical lens systems 410 and 412 in front of one of the two user's eyes 432 and 434, respectively, such that a target location of each pupil 494 is centered vertically and horizontally in front of the respective optical lens systems and/or display panels. Although the housing 414 is shown in a simplified manner similar to eyeglasses for explanatory purposes, it should be appreciated that in practice more sophisticated structures (e.g., goggles, integrated headband, helmet, straps, etc.) may be used to support and position the display systems 402 and 404 on the head 422 of user 424.

The HMD device 405 of FIG. 4, and the other HMD devices discussed herein, is capable of presenting a virtual reality display to the user, such as via corresponding video presented at a display rate such as 30 or 60 or 90 frames (or images) per second, while other embodiments of a similar system may present an augmented reality display to the user. Each of the displays 406 and 408 of FIG. 4 may generate light which is transmitted through and focused by the respective optical lens systems 410 and 412 onto the eyes 432 and 434, respectively, of the user 424. The pupil 494 aperture of each eye, through which light passes into the eye, will typically have a pupil size ranging from 2 mm (millimeters) in diameter in very bright conditions to as much as 8 mm in dark conditions, while the larger iris in which the pupil is contained may have a size of approximately 12 mm—the pupil (and enclosing iris) may further typically move within the visible portion of the eye under open eyelids by several millimeters in the horizontal and/or vertical directions, which will also move the pupil to different depths from the optical lens or other physical elements of the display for different horizontal and vertical positions as the eyeball swivels around its center (resulting in a three dimensional volume in which the pupil can move). The light entering the user's pupils is seen by the user 424 as images and/or video. In some implementations, the distance between each of the optical lens systems 410 and 412 and the user's eyes 432 and 434 may be relatively short (e.g., less than 30 mm, less than 20 mm), which advantageously causes the HMD device to appear lighter to the user since the weight of the optical lens systems and the display systems are relatively close to the user's face, and also may provide the user with a greater field of view. While not illustrated here, some embodiments of such an HMD device may include various additional internal and/or external sensors.

In the illustrated embodiment, the HMD device 405 of FIG. 4 further includes hardware sensors and additional components, such as to include one or more accelerometers and/or gyroscopes 490 (e.g., as part of one or more IMU units). As discussed in greater detail elsewhere herein, values from the accelerometer(s) and/or gyroscopes may be used to locally determine an orientation of the HMD device. In addition, the HMD device 405 may include one or more front-facing cameras, such as camera(s) 485 on the exterior of the front portion 416, and whose information may be used as part of operations of the HMD device, such as for providing AR functionality or positioning functionality. Furthermore, the HMD device 405 may further include other components 475 (e.g., electronic circuits to control display of images on the display panels 406 and 408, internal storage, one or more batteries, position tracking devices to interact with external base stations, etc.), as discussed in greater detail elsewhere herein. Other embodiments may not include one or more of the components 475, 485 and/or 490. While not illustrated here, some embodiments of such an HMD device may include various additional internal and/or external sensors, such as to track various other types of movements and position of the user's body, eyes, controllers, etc.

In the illustrated embodiment, the HMD device 405 of FIG. 4 further includes hardware sensors and additional components that may be used by disclosed embodiments as part of the described techniques for determining user pupil or gaze direction, which may be provided to one or more components associated with the HMD device for use thereby, as discussed elsewhere herein. The hardware sensors in this example include one or more eye tracking assemblies 472 of an eye tracking subsystem that are mounted on or near the display panels 406 and 408 and/or located on the interior surface 421 near the optical lens systems 410 and 412 for use in acquiring information regarding the actual locations of the user's pupils 494, such as separately for each pupil in this example.

Each of the eye tracking assemblies 472 may include one or more light sources (e.g., IR LEDs) and one or more light detectors (e.g., silicon photodiodes). Further, although only four total eye tracking assemblies 472 are shown in FIG. 4 for clarity, it should be appreciated that in practice a different number of eye tracking assemblies may be provided. In some embodiments, a total of eight eye tracking assemblies 472 are provided, four eye tracking assemblies for each eye of the user 424. Further, in at least some implementations, each eye tracking assembly includes a light source directed at one of the user's 424 eyes 432 and 434, a light detector positioned to receive light reflected by the respective eye of the user, and a polarizer positioned and configured to prevent light that is reflected via specular reflection from being imparted on the light detector.

As discussed in greater detail elsewhere herein, information from the eye tracking assemblies 472 may be used to determine and track the user's gaze direction during use of the HMD device 405. Furthermore, in at least some embodiments, the HMD device 405 may include one or more internal motors 438 (or other movement mechanisms) that may be used to move 439 the alignment and/or other positioning (e.g., in the vertical, horizontal left-and-right and/or horizontal front-and-back directions) of one or more of the optical lens systems 410 and 412 and/or display panels 406 and 408 within the housing of the HMD device 405, such as to personalize or otherwise adjust the target pupil location of one or both of the near-to-eye display systems 402 and 404 to correspond to the actual locations of one or both of the pupils 494. Such motors 438 may be controlled by, for example, user manipulation of one or more controls 437 on the housing 414 and/or via user manipulation of one or more associated separate I/O controllers (not shown). In other embodiments the HMD device 405 may control the alignment and/or other positioning of the optical lens systems 410 and 412 and/or display panels 406 and 408 without such motors 438, such as by use of adjustable positioning mechanisms (e.g., screws, sliders, ratchets, etc.) that are manually changed by the user via use of the controls 437. In addition, while the motors 438 are illustrated in FIG. 4 for only one of the near-to-eye display systems, each near-to-eye display system may have its own one or more motors in some embodiments, and in some embodiments one or more motors may be used to control (e.g., independently) each of multiple near-to-eye display systems.

While the described techniques may be used in some embodiments with a display system similar to that illustrated, in other embodiments other types of display systems may be used, including with a single optical lens and display device, or with multiple such optical lenses and display devices. Non-exclusive examples of other such devices include cameras, telescopes, microscopes, binoculars, spotting scopes, surveying scopes, etc. In addition, the described techniques may be used with a wide variety of display panels or other display devices that emit light to form images, which one or more users view through one or more optical lens. In other embodiments, the user may view one or more images through one or more optical lens that are produced in manners other than via a display panel, such as on a surface that reflects light from another light source in part or in whole.

Figure 5:
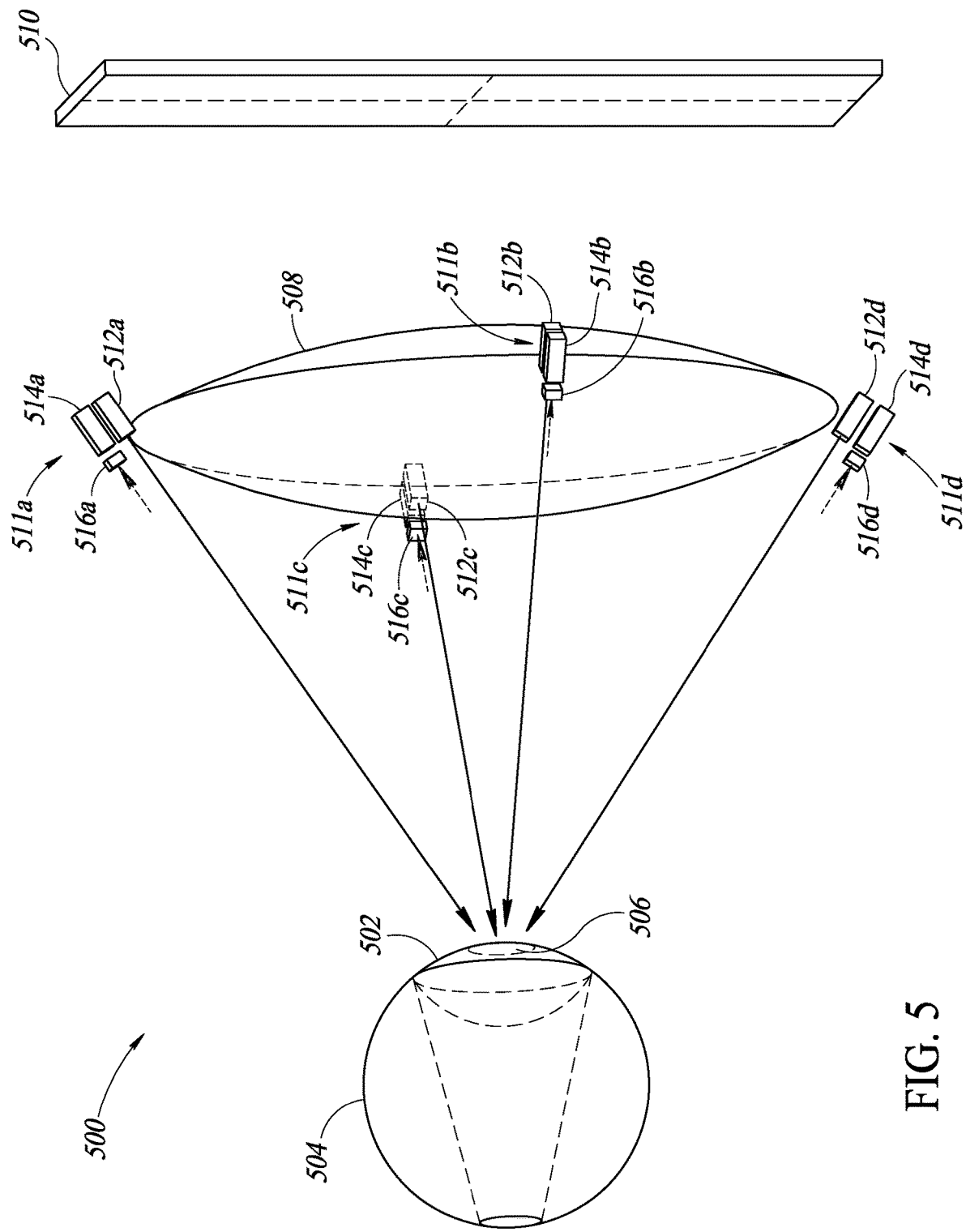
FIG. 5 illustrates an example of using light sources and light detectors to determine pupil location, such as for use in eye tracking in HMD devices in accordance with the described techniques of the present disclosure.

FIG. 5 illustrates and example of using a plurality of eye tracking assemblies that each include light sources and light detectors to determine a user's gaze location, in particular manners in particular embodiments in accordance with the described techniques. In particular, FIG. 5 includes information 500 to illustrate operation of an example display panel 510 and associated optical lens 508 in providing image information to an eye 504 of a user, such as to focus the information on a pupil 506 of the eye. In the illustrated embodiment, four eye tracking assemblies 511a-511d, collectively 511, of an eye tracking subsystem are mounted proximate the edges of the optical lens 508 and are each generally directed toward the pupil 506 of the eye 504 for emitting light toward the eye 504 and capturing light reflected from the pupil 506 or some or all the surrounding iris 502.

In the illustrated example, each of the eye tracking assemblies 511 includes a light source 512, a light detector 514, and a polarizer 516 positioned and configured to provide scattered light (diffuse reflection) to the light detector while substantially prohibiting light reflected by specular reflection from reaching the detector 514. In this example, the eye tracking assemblies 511 are placed at locations that include near the top of the optical lens 508 along a central vertical axis, near the bottom of the optical lens along the central vertical axis, near the left of the optical lens along a central horizontal axis, and near the right of the display panel along the central horizontal axis. In other embodiments, eye tracking assemblies 511 may be positioned at other locations, and fewer or more eye tracking assemblies may be used.

The polarizer 516 of each eye assembly 511 may include one or more polarizers positioned in front of the light source 512 and/or the light detector 514 to reduce or eliminate specularly reflected light from reaching the light detector 514. In one example, the polarizer 516 of a particular eye tracking assembly 511 may include two cross-linear polarizers, a first linear polarizer positioned in front of the light source 512 and a second linear polarizer oriented at 90 degrees with respect to the first polarizer positioned in front of the light detector 514 to block specular reflected light. In other implementations, one or more circular or linear polarizers may be used to prevent light reflected via specular reflection from reaching the light detectors 514, such that the light detectors substantially receive light reflected via diffuse reflection.

It will also be appreciated that the light sources and light detectors are shown for example purposes only, and that other embodiments may include more or fewer light sources or detectors, and that the light sources or detectors may be located in other locations. In addition, while not illustrated here, further hardware components may be used in some embodiments to assist in the acquisition of data from one or more of the light detectors. For example, the HMD device or other display device may include various light sources (e.g., infrared, visible light, etc.) at different positions to shine light on the iris and pupil to be reflected back to one or more light detectors, such as an light source mounted on or near the display panel 510, or instead elsewhere (e.g., between the optical lens 508 and the eye 504, such as on an interior surface, not shown, of an HMD device that includes the display panel 510 and optical lens 508). In some such embodiments, the light from such an illumination source may further be bounced off the display panel before passing through the optical lens 508 to illuminate the iris and pupil.

Figure 6:
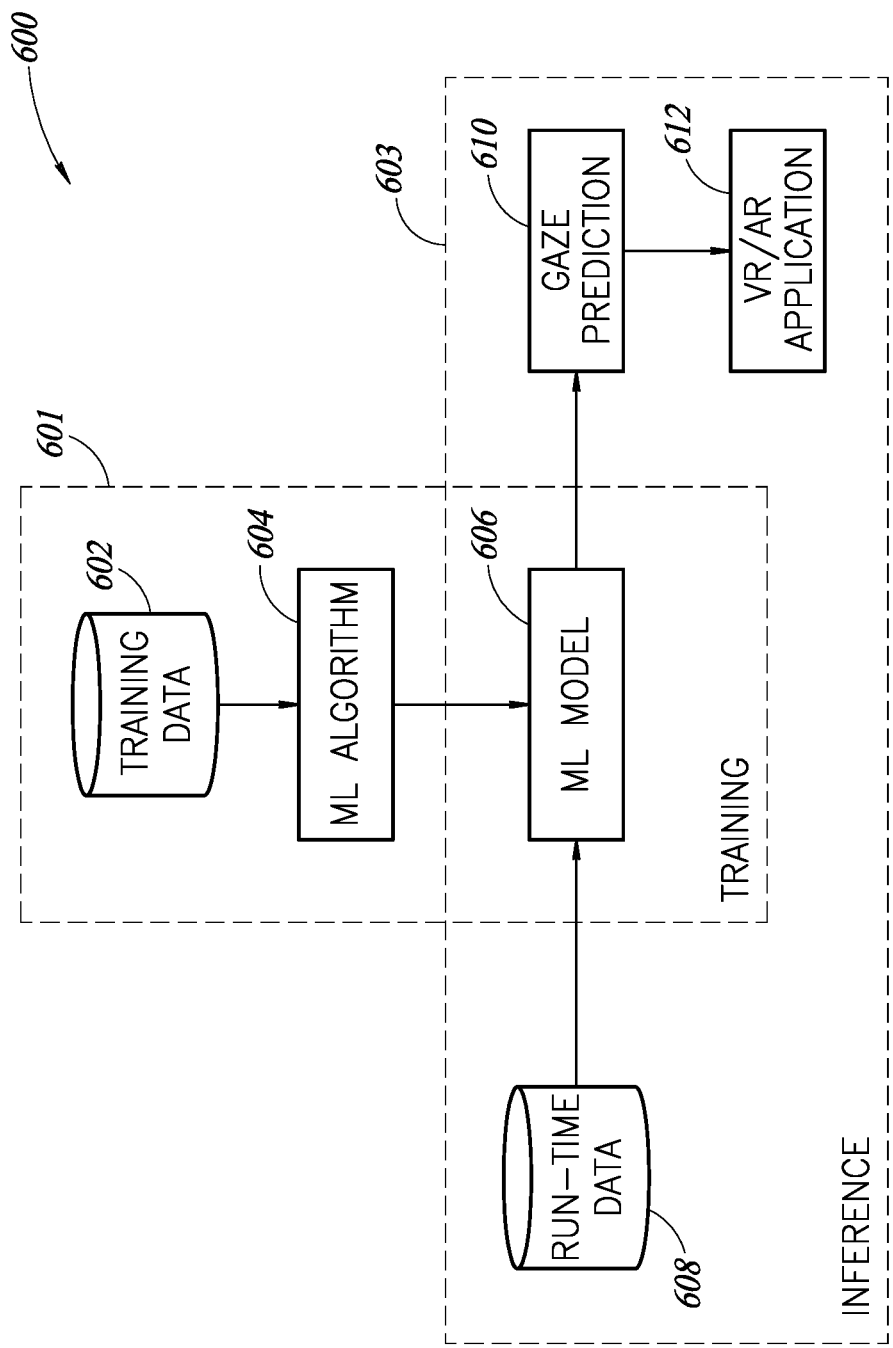
FIG. 6 is a schematic diagram of an environment in which machine learning techniques may be used to implement an eye tracking subsystem of an HMD device, according to one non-limiting illustrated implementation.

FIG. 6 is a schematic diagram of an environment 600 in which machine learning techniques may be used to implement an eye tracking subsystem of an HMD device, such as the eye tracking subsystem discussed herein, according to one non-limiting illustrated implementation. The environment 600 includes a model training portion 601 and an inference portion 603. In the training portion 601, training data 602 is fed into a machine learning algorithm 604 to generate a trained machine learning model 606. The training data may include, for example, labeled data from the light detectors that specify gaze location. As a non-limiting example, in an embodiment that includes four light detectors directed at a user's eye, each training sample may include the output from each of the four light detectors and a known or inferred gaze direction. In at least some implementations, the gaze direction of a user may be known or inferred by directing a user to gaze at a particular user interface element (e.g., a word, a dot, an "X", another shape or object, etc.) on a display of the HMD device, which user interface element may be static or may be moving on the display. The training data may also include samples wherein one or more of the light sources or light detectors are occluded, such as due to a user blinking, eye lashes, glasses, a hat, or other obstruction. For such training samples, the label may be "unknown" or "occluded" rather than a specified gaze direction.

The training data 602 may be obtained from a plurality of users and/or from a single user of an HMD system. The training data 602 may be obtained in a controlled environment and/or during actual use by user's ("field training"). Further, in at least some implementations, the model 606 may be updated or calibrated from time-to-time (e.g., periodically, continuously, after certain events) to provide accurate gaze direction predictions.

In the inference portion 603, run-time data 608 is provided as input to the trained machine learning model 606, which generates gaze direction predictions 610. Continuing with the above example, the output data of the light detectors may be provided as input to the trained machine learning model 606, which may process the data to predict a gaze location. The gaze direction predictions 610 may then be provided to one or more components associated with and HMD device, such as, for example, one or more VR or AR applications executing on an HMD device, one or more display or rendering modules, one or more mechanical controls, one or more position tracking subsystems, etc.

The machine learning techniques employed to implement the features discussed herein may include any type of suitable structures or techniques. As non-limiting examples, the machine learning model 606 may include one or more of decision trees, statistical hierarchical models, support vector machines, artificial neural networks (ANNs) such as convolutional neural networks (CNNs) or recurrent neural networks (RNNs) (e.g., long short-term memory (LSTM) networks), mixture density networks (MDNs), hidden Markov models, or others can be used. In at least some implementations, such as implementations that utilize an RNN, the machine learning model 606 may utilize past input (memory, feedback) information to predict gaze direction. Such implementations may advantageously utilize sequential data to determine motion information or previous gaze direction predictions, which may provide more accurate real-time gaze direction predictions.

Figure 7:
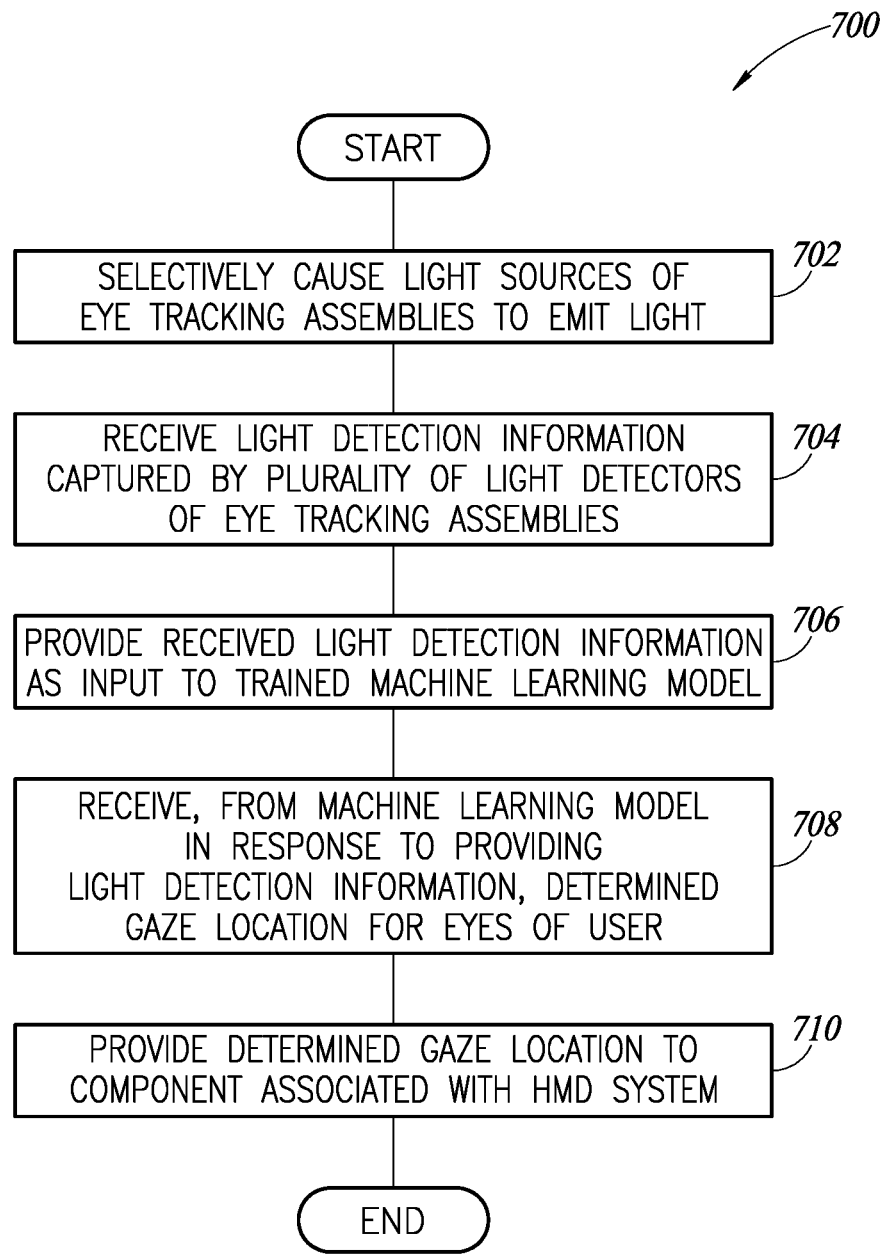
FIG. 7 is a flow diagram for a method of operating an HMD device that includes eye tracking capabilities, according to one non-limiting illustrated implementation.

FIG. 7 is a flow diagram of an example embodiment of a method 700 of operating an eye tracking subsystem of an HMD device. The method 700 may be performed by, for example, the eye tracking subsystem 135 of FIG. 1 or other systems discussed elsewhere herein. While the illustrated embodiment of the 700 discusses performing operations to determine gaze direction for a single eye, it will be appreciated that the operations of the method 700 may be applied to both eyes of a user simultaneously to track gaze direction in substantially real-time. It will also be appreciated that the illustrated embodiment of the method 700 may be implemented in software and/or hardware as appropriate, and may be performed by, for example, a computing system associated with an HMD device, for example.

As discussed above, the HMD device may include a support structure wearable on the head of a user, an eye tracking subsystem coupled to the support structure, at least one processor, ant memory storing a set of instructions or data. The eye tracking subsystem may include a plurality of eye tracking assemblies that each include a light source, a light detector, and a polarizer.

The polarizer may be positioned proximate to at least one of the light source and the light detector and may be configured to prevent light reflected via specular reflection from being received by the light detector. In at least some implementations, the polarizer may include two cross linear polarizers. In at least some implementations, for each of the plurality of eye tracking assemblies, the polarizer includes a first polarizer positioned in a light emitting path of the light source and a second polarizer positioned in a light detecting path of the light detector. More generally, the polarizer may include at least one of a circular polarizer or a linear polarizer.

Each of the light sources may be directed at a target location of a user's pupil, which may allow for lower powered light sources to be used since the energy is focused on the target location. Additionally, various optics (e.g., lenses) or types of light sources (e.g., IR lasers) may also be used to focus light on a target area. In at least some implementations, the light sources may include light emitting diodes that emit light having a wavelength that is between 780 nm and 1000 nm, for example. The light sources may be positioned away from an optical axis of an eye of the user to provide dark field illumination of the pupil. In at least some implementations, the light detectors may include silicon photodiodes that provide an output signal dependent on incident light power.

The illustrated embodiment of the method 700 begins at 702, where at least one processor of a HMD device may selectively cause the light sources of the plurality of eye tracking assemblies to emit light. The at least one processor may cause the light sources to emit light simultaneously, sequentially, in another pattern, or any combination thereof. At 704, the at least one processor may receive light detection information captured by the light detectors of the plurality of eye tracking assemblies. For example, the at least one processor may store output data received from a plurality of light detectors at one or more time periods.

At 706, the at least one processor may provide the received light detection information as input to a trained machine learning model, such as the model 606 discussed above in relation to FIG. 6. As discussed above, the machine learning model may include an RNN, an MDN, or any other type of machine learning model that is suitable to provide accurate gaze direction predictions based on light data input received from a plurality of light detectors. As discussed elsewhere herein, in other implementations a prediction model or function other than a machine learning model may be used, such as a 1D or 2D polynomial, one or more lookup tables, etc.

At 708, the at least one processor may receive, from the machine learning model in response to providing the light detection information, a determined gaze direction for an eye of the user. The determined gaze direction may be provide in any suitable format.

To calibrate or update the machine learning model, the at least one processor may cause at least one display of the HMD to present a user interface element, selectively cause the light sources of the plurality of eye tracking assemblies to emit light, and receive light detection information captured by the light detectors of the plurality of eye tracking assemblies. The light detection information, along with corresponding known or inferred gaze direction information, may be used to update the machine learning model. The model may be updated a various times as required to provide accurate gaze direction predictions. The user interface element may include a static user interface element or a moving user interface element.

At 710, the at least one processor provide the determined gaze direction to a component associated with the HMD system for use thereby. For example, the determined gaze direction may be provided to an image rendering subsystem of the HMD system to provide foveated rendering based on the determined gaze direction, as discuss above. As another example, the eye tracking subsystem may determine that the user's eyes are saccading, and may dynamically modify image rendering to take advantage of saccadic masking or saccadic suppression. For example, one or more characteristics of image rendering may be modified during saccading, such as the resolution of all or portions of images, the spatial frequencies of images, the frame rate, or any other characteristic that may allow for reduced bandwidth, lower computation requirements, or other technical benefits.

As another example, in at least some implementations the HMD device may include an interpupillary distance (IPD) adjustment component that is operative to automatically adjust one or more component of the HMD to account for variable IPD. In this example, the IPD adjustment component may receive gaze direction, and may align at least one component of the HMD system for the user based at least in part on the determined gaze direction. For example, when a user is looking at nearby objects, the IPD may be relatively shorter and the IPD adjustment may align one or more components of the HMD device accordingly. As yet another non-limiting example, the HMD device may automatically adjust a focus of a lens based on the determined gaze direction.

Although the examples above utilize machine learning techniques to determine gaze direction from light detection information, it should be appreciated that the features of the present disclosure are not limited to using machine learning techniques. Generally, any type of prediction model or function may be used. For example, in at least some implementations, rather than going directly from light detection information to gaze direction, the system may do the opposite—predict light detection information given an input gaze direction. Such methods may find a prediction function or model that performs this prediction, mapping from a gaze direction to predicted light readings for that direction. This function may be user-specific, so the system may implement a calibration process to find or customize the function. Once the prediction function has been determined or generated, the prediction function may then be inverted (e.g., with a numerical solver) to produce real-time predictions during use. Specifically, given a sample of light detection information from real sensors, the solver is operative to find the gaze direction that minimizes the error between this real reading and predicted readings from the generated prediction function. In such implementations, the output is the solved gaze direction plus a residual error, which could be used to judge the quality of the solution. In at least some implementations, some additional correction may be applied to handle various issues, such as the HMD system sliding around on the user's face during operation. The prediction function may be any type of function. As an example, a set of 2D polynomials may be used to map gaze angles to photodiode readings given a dataset of points captured from a user. In at least some other implementations, lookup tables or other approaches, including fitting a ML system to output predictions as discussed above, may also be used.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. It will similarly be appreciated that the data structures discussed above may be structured in different manners, including for databases or user interface screens/pages or other types of data structures, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

In addition, the sizes and relative positions of elements in the drawings are not necessarily drawn to scale, including the shapes of various elements and angles, with some elements enlarged and positioned to improve drawing legibility, and the particular shapes of at least some elements being selected for ease of recognition without conveying information regarding the actual shape or scale of those elements. In addition, some elements may be omitted for clarity and emphasis. Furthermore, repeated reference numbers in different drawings may signify the same or similar elements.

From the foregoing it will be appreciated that, although specific embodiments have been described herein for purposes of illustration, various modifications may be made without deviating from the spirit and scope of the invention. In addition, while certain aspects of the invention are presented at times in certain claim forms, or may not be embodied in any claims at some times, the inventors contemplate the various aspects of the invention in any available claim form. For example, while only some aspects of the invention may be recited at a particular time as being embodied in a computer-readable medium, other aspects may likewise be so embodied.

What is claimed is:

1. An eye tracking system, comprising:
   a plurality of eye tracking assemblies, each of the plurality of eye tracking assemblies includes:
   a light source;
   a light detector; and
   a polarizer positioned proximate to at least one of the light source and the light detector, the polarizer configured to prevent light reflected via specular reflection from being received by the light detector while allowing light reflected via diffuse reflection to be received by the light detector, wherein light reflected via specular reflection comprises light that is reflected from a surface at an angle equal to the angle of incidence, and light reflected via diffuse reflection comprises light that is scattered from a surface at many angles.

2. The eye tracking system of claim 1 wherein each of the light sources is directed toward an expected location of a pupil of a user.

3. The eye tracking system of claim 1 wherein the light sources comprise light emitting diodes that emit light having a wavelength that is between 780 nm and 1000 nm.

4. The eye tracking system of claim 1 wherein the light detectors comprise photodiodes.

5. The eye tracking system of claim 1 wherein the eye tracking system comprises four eye tracking assemblies positioned to determine a gaze direction of a left eye of a user and four eye tracking assemblies positioned to determine a gaze direction of a right eye of the user.

6. The eye tracking system of claim 1 wherein the polarizer comprises two cross linear polarizers.

7. The eye tracking system of claim 1 wherein, for each of the plurality of eye tracking assemblies, the polarizer comprises a first polarizer positioned in a light emitting path of the light source and a second polarizer positioned in a light detecting path of the light detector.

8. The eye tracking system of claim 1 wherein the polarizer comprises at least one of a circular polarizer or a linear polarizer.

9. The eye tracking system of claim 1 wherein, for each of the plurality of eye tracking assemblies, the light source is positioned away from an optical axis of an eye of a user to provide dark field illumination of the pupil of the eye.

10. An eye tracking system, comprising:
a plurality of eye tracking assemblies, each of the plurality of eye tracking assemblies includes:
 a light source;
 a light detector; and
 a polarizer positioned proximate to at least one of the light source and the light detector, the polarizer configured to prevent light reflected via specular reflection from being received by the light detector while allowing light reflected via diffuse reflection to be received by the light detector, wherein light reflected via specular reflection comprises light that is reflected from a surface at an angle equal to the angle of incidence, and light reflected via diffuse reflection comprises light that is scattered from a surface at many angles;
control circuitry that, in operation, causes the eye tracking system to:
 selectively cause the light sources of the plurality of eye tracking assemblies to emit light;
 receive light detection information captured by the light detectors of the plurality of eye tracking assemblies;
 provide the received light detection information as input to a prediction model;
 receive, from the prediction model in response to providing the light detection information, a determined gaze direction for an eye of a user; and
 store the determined gaze direction in a nontransitory memory.

11. The eye tracking system of claim 10 wherein the light detection information comprises a signature radiation pattern of each of the light sources after the light from the light source has reflected, scattered, or been absorbed of off the face or eye of a user.

12. The eye tracking system of claim 10 wherein each of the light sources is directed toward an expected location of a pupil of a user.

13. The eye tracking system of claim 10 wherein the light sources comprise light emitting diodes that emit light having a wavelength that is between 780 nm and 1000 nm.

14. The eye tracking system of claim 10 wherein the light detectors comprise photodiodes.

15. The eye tracking system of claim 10 wherein the eye tracking system comprises four eye tracking assemblies positioned to determine the gaze direction of a left eye of a user and four eye tracking assemblies positioned to determine the gaze direction of a right eye of the user.

16. The eye tracking system of claim 10 wherein the polarizer comprises two cross linear polarizers.

17. The eye tracking system of claim 10 wherein, for each of the plurality of eye tracking assemblies, the polarizer comprises a first polarizer positioned in a light emitting path of the light source and a second polarizer positioned in a light detecting path of the light detector.

18. The eye tracking system of claim 10 wherein the polarizer comprises at least one of a circular polarizer or a linear polarizer.

19. The eye tracking system of claim 10 wherein, for each of the plurality of eye tracking assemblies, the light source is positioned away from an optical axis of an eye of a user to provide dark field illumination of the pupil of the eye.

20. The eye tracking system of claim 10 wherein the prediction model comprises a machine learning model.

21. The eye tracking system of claim 10, further comprising at least one display, wherein, in operation, the control circuitry:
 causes the at least one display to present a user interface element;
 selectively causes the light sources of the plurality of eye tracking assemblies to emit light;
 receives light detection information captured by the light detectors of the plurality of eye tracking assemblies; and
 updates the prediction model based at least in part on the received light detection information and known or inferred gaze direction information associated with the received light detection information.

22. The eye tracking system of claim 21 wherein the user interface element includes a static user interface element or a moving user interface element.

23. The eye tracking system of claim 21 further comprising at least one display, wherein, in operation, the control circuitry:
 dynamically modifies a rendering output of the at least one display based at least in part on the determined gaze direction.

24. The eye tracking system of claim 10, further comprising an interpupillary distance (IPD) adjustment component, and, in operation, the control circuitry:
 causes the IPD adjustment component to align at least one component of the eye tracking system for a user based at least in part on the determined gaze direction.

25. A method of operating an eye tracking system that comprises a plurality of eye tracking assemblies that each include a light source, a light detector, and a polarizer, the method comprising:
 selectively causing the plurality of light sources of the plurality of eye tracking assemblies to emit light;
 preventing, by each of the respective polarizers of the plurality of eye tracking assemblies, light reflected via specular reflection from being received by the plurality of light detectors while allowing light reflected via diffuse reflection to be received by the plurality of light detectors, wherein light reflected via specular reflection comprises light that is reflected from a surface at an angle equal to the angle of incidence, and light reflected via diffuse reflection comprises light that is scattered from a surface at many angles;

receiving light detection information captured by the plurality of light detectors, the light detection information comprising the light reflected by diffuse reflection;

providing the received light detection information as input to a trained machine learning model;

receiving, from the trained machine learning model in response to providing the light detection information, a determined gaze direction for an eye of a user; and storing the determined gaze direction in a nontransitory memory.

26. The method of claim 25 wherein the light detection information comprises a signature radiation pattern of each of the light sources after the light from the light source has reflected, scattered, or been absorbed of off the face or eye of the user.

27. The method of claim 25 wherein providing the received light detection information as input to the trained machine learning model comprises providing the received light detection information as input to a mixture density network (MDN) model.

28. The method of claim 25 wherein providing the received light detection information as input to the trained machine learning model comprises providing the received light detection information as input to a recurrent neural network (RNN) model.

29. The method of claim 25 wherein providing the received light detection information as input to the trained machine learning model comprises providing the received light detection information to a machine learning model that utilizes past input information or eye motion information to determine the gaze direction.

30. The method of claim 25, further comprising training the trained machine learning model during field operation of a plurality of eye tracking systems.

31. The method of claim 25 wherein the eye tracking system comprises at least one display, and the method comprises:

dynamically modifying an output of the at least one display based at least in part on the determined gaze direction.

32. The method of claim 25, further comprising:

mechanically aligning at least one component of an HMD system for the user based at least in part on the determined gaze direction.

\* \* \* \* \*